United States Patent
Hisserich

[11] 3,897,760
[45] Aug. 5, 1975

[54] VALVE TIMING OVERLAP CONTROL FOR INTERNAL COMBUSTION ENGINES

[76] Inventor: Charles A. Hisserich, 447 Cabrillo St., Costa Mesa, Calif. 92627

[22] Filed: Oct. 9, 1973

[21] Appl. No.: 404,651

[52] U.S. Cl. ........ 123/90.16; 123/90.18; 123/90.44
[51] Int. Cl.² .......................................... F01L 1/34
[58] Field of Search........... 123/90.16, 90.18, 90.17, 123/90.44, 90.15, 90.6; 74/569

[56] References Cited
UNITED STATES PATENTS

| | | | |
|---|---|---|---|
| 2,266,077 | 12/1941 | Roan | 123/90.16 |
| 2,773,490 | 12/1956 | Miller | 123/90.16 |
| 2,780,912 | 2/1957 | Miller | 123/90.16 |
| 2,804,061 | 8/1957 | Gamble | 123/90.18 |
| 2,823,655 | 2/1958 | Repko | 123/90.16 |
| 2,880,711 | 4/1959 | Roan | 123/90.16 |
| 2,880,712 | 7/1959 | Roan | 123/90.16 |
| 3,157,166 | 11/1964 | MacNeill | 123/90.16 |

*Primary Examiner*—Charles J. Myhre
*Assistant Examiner*—Daniel J. O'Connor
*Attorney, Agent, or Firm*—Lawrence Fleming

[57] ABSTRACT

A system for varying the valve timing overlap of an internal combustion engine, i.e., the rotational angle during which the intake and exhaust valves are both open. The distance between the axis of a camshaft and the valve lifters is variable, controlling the fraction of a revolution during which the cam lobes contact the lifters. The camshaft bushings may be carried in an eccentric tube, rotatable by vacuum-responsive and/or centrifugal means to vary the distance between cams and lifters. A modification provides valve lifter arms shaped like bellcranks, whose axis of rotation is displaceable. The system proves improved efficiency and reduced emission of pollutants when the engine is operated in a regime of widely-varying speed and load.

5 Claims, 6 Drawing Figures 3,897,760

PATENTED AUG 5 1975 SHEET 1

VALVE TIMING OVERLAP CONTROL FOR INTERNAL COMBUSTION ENGINES

REFERENCE TO DISCLOSURE DOCUMENT

This invention is described in Disclosure Document No. 7015, received at the Patent Office Oct. 15, 1971.

BACKGROUND

In order for an internal combustion engine to deliver relatively high torque at relatively high rotational speeds, the valve timing should overlap. This is a leading feature of modern high-performance automobile engines. The term "modern" refers here to engines designed since about 1940, there having been few significant changes since that time. For example, in 1940-1955 Pontiac engines, the intake valve opens 10° before the exhaust valve closes, and remains open for 84° of rotation of the crankshaft after the exhaust valve opens, so that both intake and exhaust valves are open simultaneously over 94°. Such timing is called valve overlap. Racing cams have even more overlap. At high speeds, the overlap is required to get an adequate charge of fuel-air mixture into the combustion chamber, because of the limited rate of flow attainable. With such timing at low engine speeds, raw fuel is ejected out through the exhaust system. In conventional engines, the timing and overlap are fixed.

BRIEF SUMMARY

This invention relates to a system for varying the degree of valve overlap in accordance with the speed of the engine and other desired parameters, such as intake manifold vacuum. According to the invention, the distance between the axis of a camshaft and the plane of the valve lifters, is varied. The closer the cams are to the lifters, the more degrees of revolution will a lifter be in contact with the cam face. As the camshaft axis is displaced away, the angle of engagement will become smaller, i.e., the valve will be open over a smaller angle of rotation of the shaft.

The invention may be applied to a single-overhead-camshaft engine to control the open-time of both the intake and exhaust valves; or to a double-overhead-camshaft engine with similar means operating in connection with both camshafts.

DETAILED DESCRIPTION

Figure 1:
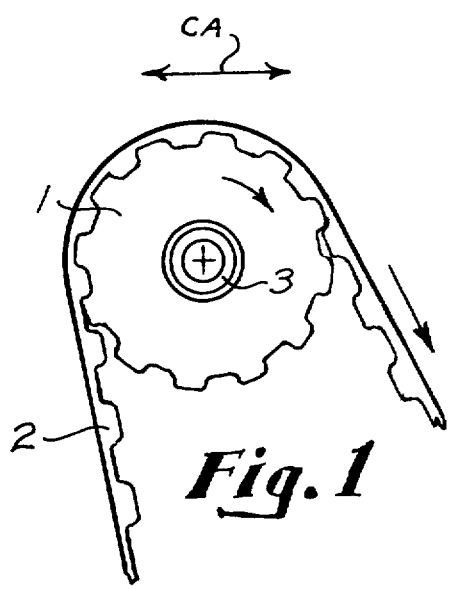
FIG. 1 is a partial view of a timing belt and toothed pulley such as may drive a camshaft.

In FIG. 1, a timing belt 2 is shown, running on a toothed pulley 1 which is fixed to a camshaft 3 of an engine. Such belts are widely used for camshaft drive, their other ends being driven from pulleys on the crankshaft. Such belts may also drive the distributor, and other accessories. Only a portion of belt 2 is shown.

Figure 2:
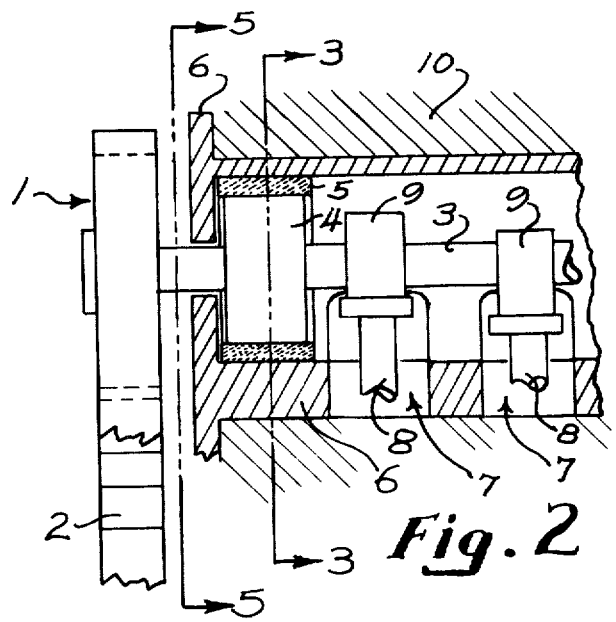
FIG. 2 is a simplified partial cross-sectional view of an engine equipped with the invention.

FIG. 2 is a simplified partial cross sectional view of an internal combustion engine having valve timing overlap control means according to the invention. Camshaft 3 has cams 9 and a front journal 4, which rotates in a conventional bushing 5. The bushing 5, along with all the other bushings for the other camshaft journals, not shown, is fitted into the bore of an eccentric tubular member 6. Tube 6 is, in turn, rotatably mounted in the engine block or cylinder head casting 10. As tube 6 is adjusted angularly in rotation in its bore in block 10, the clearance between the cams 9 and the valve lifters 8 will vary, and so effect the desired change in angle of opening, hence of valve overlap.

Figure 3:
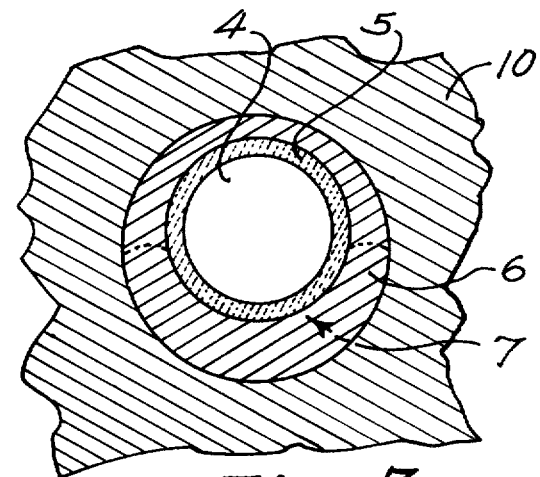
FIG. 3 is a section along lines 3–3 of FIG. 2.

FIG. 3 is a section on line 3–3 of FIG. 2, and shows how the eccentric tube 6 fits in the block or head 10, and its relation to the camshaft bushing 5 and journal 4.

Portions of the eccentric tube must be cut away in order to provide clearance for the valve lifters 8. Such openings are indicated at 7, 7 in FIG. 2 and at 7 in FIG. 3.

Figure 5:
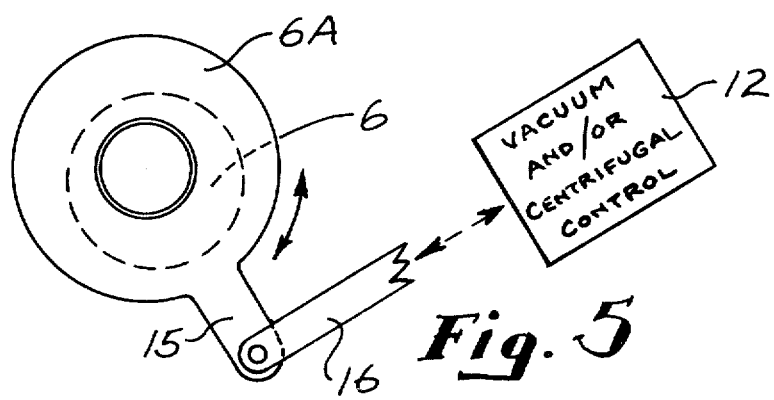
FIG. 5 is a partial view in the direction of line 5–5 of FIG. 2.

The outer end of eccentric tube 6 may have a flange 6A, FIGS. 2 and 5. This flange may carry an arm 15, FIG. 5, to which is connected a linkage 16 of any suitable known design, which operates to rotate tube 6 throughout a predetermined arc in response to suitable speed-responsive and/or vacuum-responsive devices of known type indicated generally as block 12.

Figure 4:
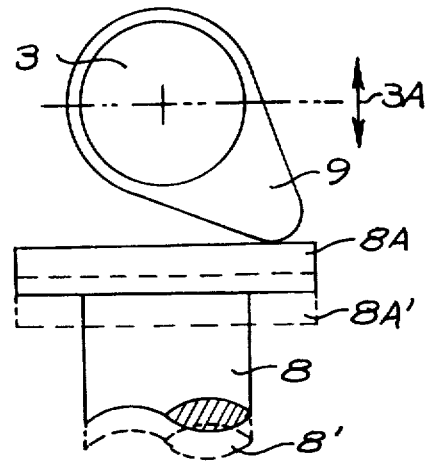
FIG. 4 is a view indicating the relation of a cam and a valve lifter.

FIG. 4 shows the engagement of a cam 9 with a valve lifter 8. If the axis of the camshaft 3 is moved upward in the direction of arrow 3A, the cam lobe will engage or contact the valve lifter face 8A throughout a smaller angle of revolution, as suggested by the dotted position of lifter 8 shown at 8' and its face at 8A'.

It will be seen that moving the camshaft axis by means of an eccentric mount, e.g., tube 6, as described above, will also change the center-to-center distance between the camshaft driving pulley such as 1 (FIGS. 1 and 2), and the crankshaft pulley and others, not shown. The resulting slack or excess tension in the belt 2 can be accommodated by means of an idler pulley, not shown, of any suitable design. Alternatively, the distributor housing, not shown, of belt 2 also drives the distributor, may be made movable in order to maintain the tension in belt 2 at a desirably constant value. When the distributor is driven by a belt such as 2, it has no other necessarily-rigid connections with the engine block, since the centrifugal advance mechanism is self-contained, and the connections to the spark plugs and the vacuum advance hose may all be flexible.

Figure 6:
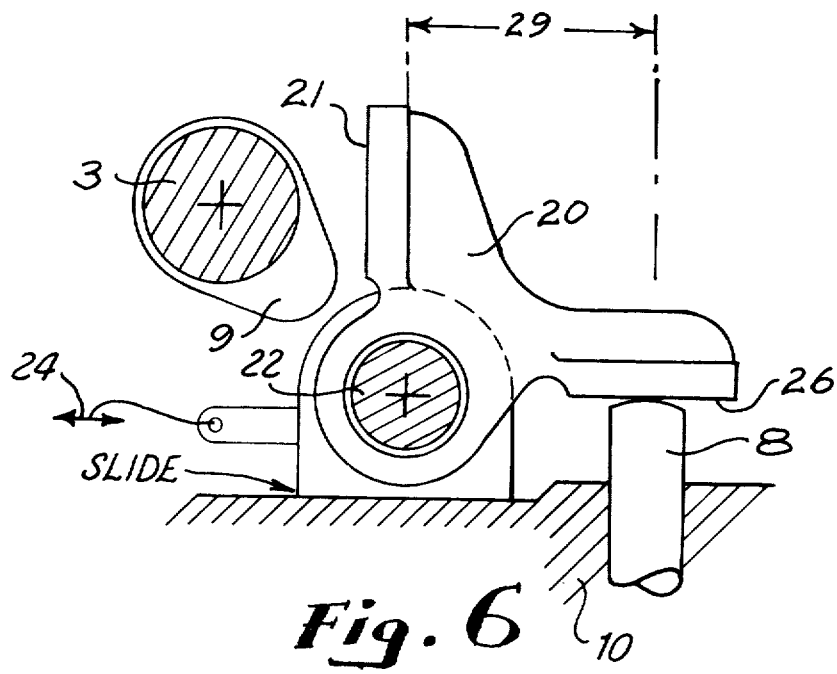
FIG. 6 is a diagrammatic view of a portion of a modification.

Additionally, other means may be employed instead of an eccentric tube such as 6, to vary the valve timing overlap. The rocker arms may be shaped in the manner of bell cranks, FIG. 6. Here, a rocker arm 20 connects a cam 9 with a valve lifter 8. Cam 9 engages a face 21 of rocker arm 20. If they are moved apart, the angle of engagement will decrease, and vice versa. The camshaft 3, FIG. 6, may be displaceable under vacuum or speed control. Such displacement may be generally in a direction perpendicular to the rocker arm face 21, as indicated by arrow 24, or by arrow CA in FIG. 1. In FIG. 6, the rocker shaft 22 may be, alternatively, displaced in a direction perpendicular to its axis, as indicated by arrow 24.

Here, the difference in tension of timing belt 2 will be relatively small, since the displacement of the shaft axis required is not large, e.g., 0.25 inch. A large valve lift is of the order of 0.5 inch. The displacement may be in arc, further reducing the change in belt tension.

In addition, with the structure of FIG. 6, the bearings of camshaft 3 may be stationary, as in a conventional engine, and the rocker arm shaft 22 made displaceable along the direction of arrow 24, as indicated above. This will vary the distance between the rocker arm face 21 and the center of the camshaft 3, effecting the desired control over the angle of valve opening. The face 26 of rocker arm 20 which engages valve lifter 8 would, in response to such displacement, move parallel to its surface. This provides an additional advantage in that the lever arm distance 29 between the center of rocker arm shaft 22 and valve lifter 8 is reduced as the rocker arm shaft 22 is displaced to the right, so that the valve opening is slightly less at small angles of opening, and conversely larger as the angle of opening is made larger (by displacing the axis of rocker arm shaft 22 to the left, FIG. 6); which is desirable at higher engine speeds.

The surfaces contacted by the cam lobes 9, such as the top of valve lifter 8A in FIG. 4 and the face 21 of rocker arm 20 in FIG. 6, are herein termed cam-engaging faces.

Any of various suitable known types of mechanism (not shown) may be employed in effecting the said displacement of the shaft 22, such as slides, pivoted arms, or parallel linkages, suitably connected to said shaft 22 (FIG. 6) via its bearing supports to displace it in the direction of the arrow 24, FIG. 6.

I claim:
1. An internal combustion engine comprising:
a camshaft having journals and cam lobes;
cam follower means having single cam-engaging faces and disposed to open poppet valves upon engagement by said lobes respectively; and
displacement means to vary the distance between the axis of said camshhaft and said cam-engaging faces to vary the angles of revolution of said camshaft during which said lobes engage said faces, wherein
said faces are end portions of axially-movable valve lifters, and
said displacement means comprises an eccentric tubular member having internal bushings carrying said journals, angular displacement of said member about its axis causing variation of said distance by displacement of the axis of said camshaft,
whereby said displacement means vary the valve timing overlap of said engine.

2. An engine as in claim 1, further comprising:
a linkage connected to said member to effect said angular displacement, and
vacuum-responsive and speed-responsive means actuably connected to said linkage.

3. An engine as in claim 1, further comprising:
rocker arms shaped generally like bell-cranks and carried on a rocker arm shaft, each said arm having a first terminal face and a second terminal face substantially perpendicular thereto,
said first faces being disposed for engagement by said cam lobes,
said second faces being disposed to engage said valve lifters, and
said displacement means comprising means to displace said rocker arm shaft in a direction substantially perpendicular to its axis.

4. An engine as in claim 3, further comprising:
control means responsive to engine speed and linked to actuate said displacement means.

5. An engine as in claim 4, further comprising:
control means responsive to intake manifold vacuum and linked to actuate said displacement means.

* * * * *